United States Patent
An et al.

(10) Patent No.: US 10,308,821 B2
(45) Date of Patent: Jun. 4, 2019

(54) FLAME RETARDANT POLYURETHANE-UREA HYBRID COATING AGENT COMPOSITION CONTAINING EXPANDABLE GRAPHITE AND MANUFACTURING METHOD THEREFOR

(71) Applicant: SKC CO., LTD., Gyeonggi-do (KR)

(72) Inventors: Byeong Uk An, Busan (KR); Joon Mo Lee, Ulsan (KR)

(73) Assignee: SKC CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/907,058

(22) PCT Filed: Jul. 23, 2014

(86) PCT No.: PCT/KR2014/006690
§ 371 (c)(1),
(2) Date: Jan. 22, 2016

(87) PCT Pub. No.: WO2015/012586
PCT Pub. Date: Jan. 29, 2015

(65) Prior Publication Data
US 2016/0177108 A1 Jun. 23, 2016

(30) Foreign Application Priority Data

Jul. 25, 2013 (KR) .................. 10-2013-0088147

(51) Int. Cl.
| | | |
|---|---|---|
| C09D 5/18 | (2006.01) | |
| C09D 175/04 | (2006.01) | |
| C09D 175/02 | (2006.01) | |
| C08G 18/79 | (2006.01) | |
| C08G 18/10 | (2006.01) | |
| C09D 175/12 | (2006.01) | |
| C08K 3/016 | (2018.01) | |
| C09D 7/61 | (2018.01) | |
| C08K 3/32 | (2006.01) | |
| C08K 3/04 | (2006.01) | |
| C08K 5/12 | (2006.01) | |
| C08K 5/521 | (2006.01) | |

(52) U.S. Cl.
CPC .............. C09D 5/18 (2013.01); C08G 18/10 (2013.01); C08G 18/797 (2013.01); C08K 3/016 (2018.01); C09D 7/61 (2018.01); C09D 175/02 (2013.01); C09D 175/04 (2013.01); C09D 175/12 (2013.01); C08K 3/04 (2013.01); C08K 5/12 (2013.01); C08K 5/521 (2013.01); C08K 2003/321 (2013.01)

(58) Field of Classification Search
CPC ....... C09D 5/18; C09D 175/04; C09D 175/02

USPC ........................... 524/710; 106/18.18, 18.19
See application file for complete search history.

(56) References Cited

U.S. PATENT DOCUMENTS

2012/0037034 A1* 2/2012 Barancyk ............... C08G 18/10
106/18.19

FOREIGN PATENT DOCUMENTS

| | | | | |
|---|---|---|---|---|
| CN | 101003611 A | * | 7/2007 | |
| CN | 101503526 A | | 8/2009 | |
| CN | 102066472 A | * | 5/2011 | ............. C08G 18/10 |
| JP | 56022361 A | | 3/1981 | |
| JP | 10204379 A | | 8/1998 | |
| JP | 2003026747 A | | 1/2003 | |
| JP | 2013053265 A | * | 3/2013 | |
| KR | 1020050077551 A | | 8/2005 | |
| KR | 1020060069721 A | | 6/2006 | |
| KR | 1020110009251 A | | 1/2011 | |
| KR | 1020110012099 A | | 2/2011 | |
| KR | 1020130011524 A | | 1/2013 | |
| KR | 1020130027419 A | | 3/2013 | |
| WO | 2007050000 A1 | | 5/2007 | |
| WO | 2009121821 A1 | | 10/2009 | |
| WO | 2012067841 A2 | | 5/2012 | |
| WO | WO 2012067841 A2 | * | 5/2012 | ......... C08G 18/4841 |
| WO | 2013003054 A1 | | 1/2013 | |
| WO | 2013003261 A2 | | 1/2013 | |
| WO | WO 2013003261 A2 | * | 1/2013 | .............. C08J 9/365 |
| WO | 2013100633 A1 | | 7/2013 | |
| WO | WO 2013100633 A1 | * | 7/2013 | ......... C08G 18/7678 |

OTHER PUBLICATIONS

Katie L. Skok and Roeland J. Tuinman, "New Modified Liquid Pure MDI for CASE Applications," 2007, Huntsman Polyurethanes, Auburn Hills, Michigan.
"The Jeffamine Polyetheramines," 2007, Huntsman Corporation, The Woodlands, Texas.
"Product Safety Assessment: COW Modified Methyl Diphenyl Diisocyante (MDI) Products", The Dow Chemical Company, Aug. 21, 2015, pp. 1-8.

* cited by examiner

*Primary Examiner* — Kelechi Egwim
(74) *Attorney, Agent, or Firm* — McNees Wallace & Nurick LLC

(57) ABSTRACT

Disclosed are a flame retardant polyurethane-urea hybrid coating agent composition containing expanded graphite and a method of preparing the same. More particularly, it relates to a flame retardant polyurethane-urea hybrid coating agent composition which is formed as a film on surfaces of coated structures, when coated on the interiors and exteriors of building structures, vessels, and marine structures, and, after the film formation, does not discharge toxic gases, particularly black smoke, and has a characteristic to self-extinguish within several seconds, in case of fire, and a method of manufacturing the same.

20 Claims, No Drawings

FLAME RETARDANT POLYURETHANE-UREA HYBRID COATING AGENT COMPOSITION CONTAINING EXPANDABLE GRAPHITE AND MANUFACTURING METHOD THEREFOR

TECHNICAL FIELD

The present disclosure relates to a flame retardant polyurethane-urea hybrid coating agent composition containing expanded graphite and a method of preparing the same. More particularly, it relates to a flame retardant polyurethane-urea hybrid coating agent composition which is formed as a film on surfaces of coated structures, when coated on the interiors and exteriors of building structures, vessels, and marine structures, and, after the film formation, does not discharge toxic gases, particularly black smoke, and has a characteristic to self extinguish within several seconds, in case of fire, and a method of preparing the same.

BACKGROUND ART

In general, halogen-based flame retardant agents, phosphorous flame retardant agents, inorganic flame retardant agents, etc. are used as polyurea flame retardant coating agents. Thereamong, halogen-based flame retardant agents as most generally used agents have an advantage of low costs. However, halogen-based flame retardant agents emit a large amount of toxic gases upon combustion and the halogen-based flame retardant agents are harmful to workers and the environment per se.

It is known that phosphorous flame retardants have 2 to 4 times higher flame retardant effects than halogen-based flame retardant coating agents, i.e., flame retardant coating agents to which a bromo or chloro group is introduced. However, since phosphorous is also an organic element, toxic gas reduction effects of phosphorous flame retardants are slight under ignition and direct heating conditions with maximum flame (1200□ or more) of a butane gas torch.

In the case of inorganic agents, flame retardant effects are somewhat exhibited at 600° C. or less, but are not almost exhibited at an ultrahigh temperature above 600□. In order to exhibit sufficient flame retardancy at 600° C. or more, the inorganic agents should be applied in an amount of 70% or more based on total solids when applied to coating agents. Accordingly, it is impossible to apply the inorganic agents to a working process.

In patent WO2009/121821A, flame retardancy of expanded graphite is used. Particularly, a thermoplastic molding composition or a foamed molding composition, such as polyethylene (PE), polypropylene (PP), or polyvinyl chloride (PVC), containing expandable graphite or a fluorine-containing polymer (e.g., fluorinated ethylene), as a flame retardant, represented by Formula 1 below is disclosed.

[Formula 1]

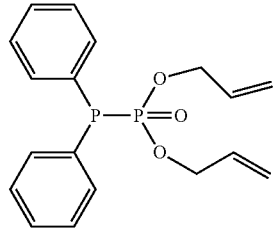

In addition, Korean Patent Laid-Open Publication No. 10-2006-0069721 relates to a method of preparing flame retardant polystyrene foam resin particles having inflammability. In particular, a method of imparting inflammability through formation of porous char (carbonized core) in the combustion by coating foamed polystyrene resin particles with expanded graphite particles, which have a layered crystalline structure and are expended 20 to 350 fold in size when heated, is disclosed.

However, the use of such known flame retardants is still inconvenient, or other properties as well as flame retardancy should still be enhanced.

The above information disclosed in this background section is only for enhancement of understanding of the background of the invention and therefore it may contain information that does not form the prior art that is already known in this country to a person of ordinary skill in the art.

RELATED DOCUMENTS

Patent Document (Patent Document 1) 1. WO 2009/121821 A
(Patent Document 2) 2. Korean Patent Laid-Open Publication No. 10-2006-0069721

DISCLOSURE

Technical Problem

As described above, technology related to a thermoplastic composition or a foam using expanded graphite with flame retardancy is already known. However, it was confirmed that, when a coating agent composition applied to the interiors and the exteriors of building structures, vessels, or marine structures is prepared by mixing a proper composition of resin and expanded graphite, problems such as release of toxic smoke can be addressed and properties such as flame retardancy are excellent, thereby completing the present invention.

Therefore, the present invention has been made in view of the above problems, and one object of the present invention is to provide a polyurethane-urea hybrid coating agent composition with superior flame retardancy, containing expanded graphite.

The other object of the present invention is to provide a method of preferably preparing a flame retardant polyurethane-urea hybrid coating agent composition.

Technical Solution

In accordance with an aspect of the present invention, the above and other objects can be accomplished by the provision of a flame retardant polyurethane-urea hybrid coating agent composition containing expanded graphite, wherein the flame retardant polyurethane-urea hybrid coating agent composition is a binary composition composed of a hardening agent and a main material, wherein the hardening agent is a prepolymer having an isocyanate terminal obtained by addition-polymerizing divalent to octavalent polyether-based polyol, divalent or trivalent polyester-based polyol, or a mixture including the polyether-based polyol and the polyester-based polyol in a weight ratio of 9:1 to 1:9, and modified methyl diphenyl diisocyanate having carbodiimide bond, in a weight ratio of 5:5 to 2.5:7.5; the main material is a mixture of a flame retardant including 30 to 70 parts by weight of a polyphosphate-based flame retardant and 5 to 40 parts by weight of an inorganic flame retardant based on 100 parts by weight of expanded graphite, 200 to 400 parts by weight of ether-type polyol having a divalent or trivalent amine terminal, 20 to 300 parts by weight of at least one polyol selected from the group consisting of divalent and trivalent polyester-based polyols and divalent to octavalent polyether-based polyols, and 80 to 200 parts by weight of a divalent amine monomer as a chain extender based on 100 parts by weight of the flame retardant.

Other aspects and preferred embodiments of the invention are discussed infra.

Advantageous Effects

As apparent from the fore-going, a film formed of the flame retardant coating agent composition according to the present invention does not emit toxic black smoke at all even when directly ignited and burned with maximum flame having a temperature of about 1600° C. of a butane gas torch and has a characteristic to self extinguish within several seconds, thereby having superior flame retardancy.

BEST MODE

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

A flame retardant polyurethane-urea hybrid coating agent composition according to the present invention is composed of a binary composition including a hardening agent and a main material.

The hardening agent of the present invention includes the following ingredients.

The hardening agent according to the composition of the present invention may be formed of a prepolymer having an isocyanate terminal by addition-polymerizing modified methyl diphenyl diisocyanate having a carbodiimide bond with divalent to octavalent polyether-based polyol alone, divalent to trivalent polyester-based polyol alone, or a mixture of the polyols.

Here, when the mixture including the polyether-based and polyester-based polyols is used, a weight ratio of the polyether-based polyol to the polyester-based polyols may be 9:1 to 1:9, particularly 9:1 to 7:3, more particularly 9:1 to 8:2.

When the modified methyl diphenyl diisocyanate having a carbodiimide bond is addition-polymerized with the polyols or the mixture thereof, a weight ratio of the modified methyl diphenyl diisocyanate to the polyols or the mixture may be 5:5 to 2.5:7.5, particularly 4:6 to 3:7, more particularly 3.5:6.5 to 3:7. Accordingly, a prepolymer having an isocyanate terminal is prepared to be used as a hardening agent.

According to the present invention, a flame retardant additive may be additionally added to the prepolymer of the hardening agent. As representative examples of the flame retardant additive, there are trimethylphosphate, triphenylphosphate, tricresylphosphate, trixylenylphosphate, resorcinol bis(diphenylphosphate), phenyl diresorcinol phosphate, bisphenol diphenyl phosphate, cresyl diphenyl phosphate, xylenyl diphenyl phosphate, phenyl di(isopropylphenyl) phosphate, triisophenyl phosphate, diphenylphosphate, resorcinol diphosphate, aromatic polyphosphate, phosphoric acid guanidine, phosphoric acid ammonium, phosphoric acid melamine, polyphosphoric acidammonium, n-butyl acid phosphate, trichloro propyl phosphate, and triethylphosphite. One or more selected from these flame retardant additives may be used as the flame retardant additive.

In addition, an additive may be added to the prepolymer of the hardening agent. As a representative example of the additive, one or more plasticizers selected from diisobutyl phthalate, dibutyl phthalate, benzylbutyl phthalate, di-n-octyl phthalate, diisodecyl phthalate, diethylhexyl phthalate, diisononyl phthalate, and propylene carbonate may be used.

Meanwhile, the main material of the present invention includes the following ingredients.

As the main material of the present invention, a mixture including 100 parts by weight of a flame retardant, 200 to 400 parts by weight of ether-type polyol having an amine terminal, 20 to 300 parts by weight of a polyester-based or polyether-based polyol, and 80 to 200 parts by weight of a chain extender may be used.

Here, as the flame retardant, a mixture including 30 to 70 parts by weight of a polyphosphate-based flame retardant and 5 to 40 parts by weight of an inorganic-based flame retardant based on 100 parts by weight of the expanded graphite may be used.

In addition, the Ether-type polyol preferably has a divalent to trivalent amine terminal, and the polyester-based or polyether-based polyol may be at least one selected from the group consisting of divalent to trivalent polyester-based polyols or divalent to octavalent polyether-based polyols. As the chain extender, a divalent amine monomer is preferably used.

In regard to such a main material, other ingredients, other than the ingredients, may be additionally added to 100 parts by weight of the flame retardant. For example, so as to adjust reactivity, divalent to pentavalent polyalcohol may be added in an amount of 5 to 50 parts by weight. As the polyalcohol, divalent alcohol such as ethylene glycol, diethylene glycol, propylene glycol, dipropylene glycol, butanediol, pentanediol, hexanediol, neopentyl glycol, and cyclohexylene glycol; trivalent alcohol such as trimethylolpropane and glycerin; or pentavalent or less alcohol such as pentaerythritol, sorbitol, methylglycoside, diglycerin, sorbitol, and sucrose may be used.

In addition, as needed, an amine catalyst such as triethylenediamine, pentamethylene diethyltetramine, N-ethylmorpholine, diethylethanolamine, and 1,8-diazabicyclo (5.4.0)undecene-7 and/or a metal catalyst such as stannous octylate, dibutyltin dilaurate, and lead octylate may be included in an amount of 0.1 to 5 parts by weight in winter and at low temperature for providing activity to urea reaction. Alternatively, when the amine catalyst and the metal catalyst are included together, the amount thereof may be 0.2 to 6 parts by weight.

As an embodiment, a method of preparing the flame retardant coating agent composition according to the present invention is described as follows.

A method of preparing the flame retardant coating agent composition composed of the binary composition of the hardening agent and the main material according to the present invention includes preparing the hardening agent by addition-polymerizing while stirring at 60 to 90° C. under a nitrogen atmosphere after feeding divalent to pentavalent polyether-based polyol, divalent or trivalent polyester-based polyol, or a mixture including the polyether-based polyol and the polyester-based polyol in a weight ratio of 9:1 to 1:9, and modified methyl diphenyl diisocyanate having a carbodiimide bond in a weight ratio of 5:5 to 2.5:7.5 to a rector, to obtain a prepolymer having an isocyanate terminal; and preparing the main material by preparing a flame retardant through mixing 30 to 70 parts by weight of a polyphosphate-based flame retardant and 5 to 40 parts by weight of an inorganic flame retardant based on 100 parts by weight of expanded graphite, and mixing 200 to 400 parts by weight of ether-type polyol having a divalent or trivalent amine terminal, 20 to 300 parts by weight of at least one polyol selected from the group consisting of divalent and trivalent polyester-based polyols and divalent to octavalent polyether-based polyols, and 80 to 200 parts by weight of a divalent amine monomer as a chain extender based on 100 parts by weight of the flame retardant.

In the present invention, the hardening agent is addition-polymerized until the theoretical content of isocyanate is reached at 60 to 90° C. while stirring under a nitrogen atmosphere after putting polyols and the modified methyl diphenyl diisocyanate into a reactor.

Here, the expression "until the theoretical content of isocyanate is reached" means performing reaction until a prepolymer having a desired final isocyanate terminal is obtained. Particularly, a hydroxyl group of polyol and an isocyanate group of diisocyanate react during reaction of polyol and diisocyanate, and isocyanate remaining after this reaction is analyzed through a dibutylamine back titration method. Accordingly, the amount of the remaining isocyanate can be calculated as a percentage (%). When such a calculated % value is the same as a value (10 to 20%) set when designed, i.e., a theoretical value, the prepolymer having the desired final isocyanate terminal can be obtained.

According to the present invention, after such addition polymerization, temperature is additionally cooled to 50° C. or less, and one or more selected from trimethylphosphate, triphenylphosphate, tricresylphosphate, trichloro propyl phosphate, diisononyl phthalate, diisobutyl phthalate, dibutyl phthalate, benzylbutyl phthalate, di-n-octyl phthalate, diisodecyl phthalate, diethylhexyl phthalate, and propylene carbonate is added to the prepolymer to obtain a hardening agent.

According to the present invention, the main material is applied and mixed based on the composition of the hardening agent to obtain a final polyurethane-urea hybrid coating agent composition.

The coating agent composition according to the present invention is composed of the binary composition of the main material and the hardening agent, and may form a flame retardant film by being hardened within several seconds when the two ingredients are coated or sprayed by means of a sprayer, etc.

The hardening agent according to the present invention is a prepolymer having, as a chain terminal, an isocyanate group obtained by reacting modified isocyanate having a carbodiimide bond with polyols. More particularly, the hardening agent is synthesized into a prepolymer having an isocyanate group at a chain terminal and urethane and imide groups in a chain by addition-polymerizing modified methyl diphenyl diisocyanate having a carbodiimide bond with one or more polyols selected from the group consisting of divalent or more polyester polyols and divalent or more polyether polyols. More preferably, a phosphorous flame retardant, a plasticizer, an acid stabilizer, etc. are added to provide flame retardancy, viscosity and storability, thereby preparing the hardening agent.

The main material used based on such a hardening agent according to the present invention is composed of a polyurethane-urea based material, and may contain expanded graphite as a flame retardant and be composed of divalent or more aminepolyol, polyether polyol, polyester polyol, multivalent amine, multivalent alcohol, etc., which react with the prepolymer of the hardening agent. More particularly, the main material composing the polyurethane-urea based coating agent includes the expanded graphite as an essential ingredient, and, in addition to this, a nitrogen-based flame retardant such as melamine cyanurate or melamine phosphonate as a nitrogen-based flame retardant, a polyphosphate-based flame retardant additive, such as aluminum phosphinates, aluminum phosphates, aluminum poly triphosphates, zinc phosphates, ammonium polyphosphates, red phosphorous, white red phosphorous, trimethylphosphate, triphenylphosphate, tricresylphosphate, or triethylphosphite as a phosphoric acid-based flame retardant additive, a flame retardant mixed with any one or more of, for example, antimony trioxide, aluminum trihydroxide, magnesium hydroxide, magnesium carbonate, zinc borate, and boron nitride as an inorganic flame retardant additive, one or more polyols selected from ether-type polyol groups having a divalent or more amine terminal, one or more polyols selected from divalent or more polyester-based polyols and polyether-based polyol groups, and a divalent or more amine monomer as a chain extender. In addition, so as to adjust reactivity, divalent or more alcohol may be used, and, so as to provide activity to urethane and urea reactions, an amine catalyst and/or a metal catalyst may be included.

When the binary composition coating agent composition according to the present invention is used to form a film, by coating or spraying by means of a sprayer etc., while mixing in a predetermined concentration at a specific temperature, a flame retardant film having superior flame retardancy may be formed.

The present invention uses the expanded graphite to address a problem of toxic smoke occurring even when the existing halogen-based and/or phosphorous flame retardant is added.

A film coated with a flame retardant coating agent composition obtained according to the present invention was subjected to a flame retardancy test in which the coated film was directly ignited and burned with maximum flame (about 1600° C.) of a butane gas torch. As a result, it was confirmed that black smoke was not generated at all in spite of a long test time of about one minute.

In the following examples, the present invention will be described in more detail. It should be understood that the examples are merely to concretely explain the spirit of the invention and therefore, there is no intent to limit the invention to the examples. Units of ingredients used in the present invention mean parts by weight.

Preparation Example 1

Hardening agents 1 to 12 were prepared according to composition ratios summarized in Tables 1 to 3 below. Modified diphenyl diisocyanate having carbodiimide bond and polyetherpolyol were reacted at 85° C. under a nitrogen atmosphere. The content of isocyanate was measured through wet analysis using a dibutylamine back titration method, and the reaction was terminated when the content of isocyanate was 12.5 to 17.5% (based on weight). Subsequently, trimethylphosphate, triphenylphosphate, tricresylphosphate, trichloro propyl phosphate, diisononyl phthalate, and diisobutyl phthalate were added to the prepolymer, thereby preparing a hardening agent.

TABLE 1

| | Hardening agent | | | | |
|---|---|---|---|---|---|
| | 1 | 2 | 3 | 4 | 5 |
| Polyester polyol | 100 | 0 | 90 | 80 | 70 |
| Polyether polyol | 0 | 100 | 10 | 20 | 30 |
| Modified methyldiphenyl diisocyanate | 200 | 200 | 200 | 200 | 200 |

TABLE 2

| | Hardening agent | | | | |
|---|---|---|---|---|---|
| | 6 | 7 | 8 | 9 | 10 |
| Polyether polyol | 100 | 100 | 100 | 100 | 100 |
| Modified methyldiphenyl diisocyanate | 185 | 233 | 166 | 150 | 100 |

TABLE 3

| | Hardening agent | |
|---|---|---|
| | 11 | 12 |
| Polyether polyol | 100 | 100 |
| Modified methyldiphenyl diisocyanate | 50 | 30 |

Preparation Example 2

A multivalent alcohol monomer (1.4-butanediol), an amine-based catalyst (triethylene diammonium), and a metal-based catalyst (dibutyl tin dilaurate) were blended according to compositions of Table 4 to Table 6. Accordingly, main materials 1 to 12 were obtained.

TABLE 4

| | Main material | | | | |
|---|---|---|---|---|---|
| | 1 | 2 | 3 | 4 | 5 |
| Expanded graphite | 100 | 100 | 100 | 100 | 100 |
| Polyphosphate-based flame retardant | 40 | 60 | 50 | 50 | 50 |
| Inorganic flame retardant | 20 | 20 | 20 | 20 | 20 |
| Ether-based polyol having amine terminal | 350 | 350 | 350 | 350 | 400 |
| Poly ester-based polyol | 10 | 10 | 10 | 0 | 0 |
| Poly ether-based polyol | 140 | 140 | 140 | 150 | 150 |
| Amine monomer | 125 | 125 | 125 | 125 | 125 |

TABLE 5

| | Main material | | | | |
|---|---|---|---|---|---|
| | 6 | 7 | 8 | 9 | 10 |
| Expanded graphite | 100 | 100 | 100 | 100 | 100 |
| Polyphosphate-based flame retardant | 50 | 50 | 50 | 50 | 50 |
| Inorganic flame retardant | 20 | 20 | 20 | 20 | 20 |
| Ether-based polyol having amine terminal | 400 | 400 | 350 | 350 | 350 |
| Polyester-based polyol | 0 | 0 | 10 | 10 | 10 |
| Poly ether based polyol | 200 | 250 | 140 | 140 | 140 |
| Amine monomer | 125 | 125 | 140 | 165 | 200 |

TABLE 6

| | Main material | |
|---|---|---|
| | 11 | 12 |
| Expanded graphite | 100 | 100 |
| Polyphosphate-based flame retardant | 50 | 50 |
| Inorganic flame retardant | 20 | 20 |
| Ether-based polyol having amine terminal | 50 | 30 |
| Polyester-based polyol | 10 | 10 |
| Poly ether-based polyol | 40 | 10 |
| Amine monomer | 300 | 315 |

Examples 1 to 18

Preparation of Flame Retardant Coating Agent Compositions

The main materials and the hardening agents were mixed as summarized in Table 7 below. Here, the main materials and the hardening agents were mixed in a liquid ratio of 1:1 using a spraying machine. Conditions of the spraying machine were set such that molding was performed under a pressure of 1300 psi to 2000 psi at 55 to 85° C. Coating (spraying) was carried out under these conditions to obtain a polyurethane-urea coat having a coat thickness of 1.0 mm to 4 mm. Results for property evaluation are summarized in Table 9.

TABLE 7

| Examples | Hardening agent | Main material |
|---|---|---|
| 1 | 1 | 3 |
| 2 | 2 | 3 |
| 3 | 3 | 3 |
| 4 | 4 | 3 |
| 5 | 5 | 3 |
| 6 | 6 | 3 |
| 7 | 7 | 3 |
| 8 | 8 | 3 |
| 9 | 2 | 1 |
| 10 | 2 | 2 |
| 11 | 2 | 3 |
| 12 | 2 | 4 |
| 13 | 2 | 5 |
| 14 | 2 | 6 |
| 15 | 2 | 7 |
| 16 | 2 | 8 |
| 17 | 2 | 9 |
| 18 | 2 | 10 |

Comparative Examples 1 to 4

Preparation of Coating Agent

The main materials and the hardening agents were mixed as summarized in Table 8 below. Here, the main materials and the hardening agents were mixed in a liquid ratio of 1:1 using a spraying machine. Conditions of the spraying machine were set such that molding was performed under a pressure of 1300 psi to 2000 psi at 55 to 85° C. Coating (spraying) was carried out according to this condition to obtain a polyurethane-urea coat having a coat thickness of 1.0 mm to 4 mm. Results for property evaluation are summarized in Table 10.

TABLE 8

| Comparative Examples | Hardening agent | Main material |
|---|---|---|
| 1 | 11 | 3 |
| 2 | 12 | 3 |
| 3 | 3 | 11 |
| 4 | 3 | 12 |

Experimental Example

Properties of the coated films of the examples and the comparative examples were measured according to the following methods. Results are summarized in Tables 9 and 10 below.

Property Measurement Methods

Tensile strength of coating layer—Measured according to ISO 527-1 test standard

Elongation—Measured according to ISO 527 test standard

Tear strength—Measured according to ISO 6383-1 test standard

Hardness (D type)—Measured according to DIN 53505 test standard

Moisture permeability—Measured according to ISO 12572 test standard

Water absorption degree—Measured according to DIN EN 12087 test standard

Flame retardancy—Measured according to DIN 4102 (part 1, B2) test standard

TABLE 9

| Examples | Tensile strength (MPa) | Elongation (%) | Tear strength (MPa) | Hardness | Moisture permeability (g/m² · 24 h) | Water absorption degree (%) | Flame retardancy |
|---|---|---|---|---|---|---|---|
| 1 | 7.5 | 58 | 1↑ | 45 | 0.4 | 5.3 | O.K |
| 2 | 7.3 | 60 | 1↑ | 43 | 0.2 | 3.5 | O.K |
| 3 | 7.4 | 59 | 1↑ | 44 | 0.2 | 3.3 | O.K |
| 4 | 7.3 | 60 | 1↑ | 43 | 0.3 | 4.9 | O.K |
| 5 | 7.3 | 61 | 1↑ | 44 | 0.3 | 4.0 | O.K |
| 6 | 9.0 | 42 | 1↑ | 51 | 0.1 | 3.0 | O.K |
| 7 | 11.3 | 37 | 1↑ | 57 | 0.1 | 2.4 | O.K |
| 8 | 14.2 | 31 | 1↑ | 61 | 0.1 | 2.1 | O.K |
| 9 | 7.2 | 61 | 1↑ | 41 | 0.2 | 3.5 | O.K |
| 10 | 6.8 | 65 | 1↑ | 40 | 0.2 | 3.6 | O.K |
| 11 | 7.3 | 60 | 1↑ | 43 | 0.2 | 3.5 | O.K |
| 12 | 8.0 | 57 | 1↑ | 45 | 0.17 | 3.2 | O.K |
| 13 | 8.1 | 56 | 1↑ | 46 | 0.16 | 3.0 | O.K |
| 14 | 5.0 | 77 | 1↑ | 32 | 0.4 | 5.0 | O.K |
| 15 | 5.3 | 72 | 1↑ | 33 | 0.37 | 4.8 | O.K |
| 16 | 7.0 | 63 | 1↑ | 42 | 0.2 | 3.6 | O.K |
| 17 | 7.1 | 62 | 1↑ | 43 | 0.2 | 3.5 | O.K |
| 18 | 9.0 | 50 | 1↑ | 51 | 0.1 | 2.4 | O.K |

TABLE 10

| Comparative Examples | Tensile strength (MPa) | Elongation (%) | Tear strength (MPa) | Hardness | Moisture permeability (g/m² · 24 h) | Water absorption degree (%) | Flame retardancy |
|---|---|---|---|---|---|---|---|
| 1 | Coating film not formed | Coating film not formed | Coating film not formed | Coating film not formed | Coating film not formed | Coating film not formed | Coating film not formed |
| 2 | Same | Same | Same | Same | Same | Same | Same |
| 3 | Same | Same | Same | Same | Same | Same | Same |
| 4 | Same | Same | Same | Same | Same | Same | Same |

INDUSTRIAL APPLICABILITY

A flame retardant polyurethane-urea hybrid coating agent composition according to the present invention can be used as a coating agent in the interiors and exteriors of building structures, vessels and marine structures. The flame retardant polyurethane-urea hybrid coating agent composition which is formed as a film on surfaces of coated structures, does not discharge toxic gases, particularly black smoke, and has a characteristic to self-extinguish within several seconds, in case of fire, and thus, can be used as a flame retardant coating agent.

The invention claimed is:

1. A flame retardant composition comprising:
   a) expanded graphite; and
   b) a polyurethane-urea hybrid coating agent composition;
      wherein the polyurethane-urea hybrid coating agent composition includes a binary composition composed of a hardening agent and a main material;
         wherein the hardening agent comprises a prepolymer having an isocyanate terminal which is a polymerization product of a mixture comprising divalent to octavalent polyether-based polyol, and divalent or trivalent polyester-based polyol, the mixture comprising the polyether-based polyol and the polyester- based polyol in a weight ratio of 9:1 to 1:9, and a modified methyl diphenyl diisocyanate having a carbodiimide bond, in a weight ratio of the mixture of polyols to the modified methyl diphenyl diisocyanate of 5:5 to 2.5:7.5; and
         wherein the main material is a mixture of 200 to 400 parts by weight of ether-type polyol having a divalent or trivalent amine terminal, 20 to 300 parts by weight of at least one polyol selected from the group consisting of divalent and trivalent polyester-based polyols and divalent to octavalent polyether-based polyols, and 80 to 200 parts by weight of a divalent amine monomer as a chain extender based on 100 parts by weight of the flame retardant composition;
      wherein the flame retardant composition comprises 30 to 70 parts by weight of a polyphosphate-based flame retardant and 5 to 40 parts by weight of an inorganic flame retardant based on 100 parts by weight of the expanded graphite.

2. The flame retardant composition according to claim 1, wherein a weight ratio of the polyether-based polyol to polyester-based polyol is 9:1 to 7:3.

3. The flame retardant composition according to claim 1, wherein a weight ratio of the mixture comprising the polyether-based polyol and the polyester-based polyol is 9:1 to 8:2.

4. The flame retardant composition according to claim 1, wherein a weight ratio of the mixture of polyols to modified methyl diphenyl diisocyanate is 4:6 to 3:7.

5. The flame retardant composition according to claim 1, wherein a weight ratio of the mixture of the polyols to modified methyl diphenyl diisocyanate is 3.5:6.5 to 3:7.

6. The flame retardant composition according to claim 1, wherein one or more of n-butyl acid phosphate, trimethylphosphate, triphenylphosphate, tricresylphosphate, triethylphosphate or trichloro propyl phosphate as a flame retardant additive is additionally added to the prepolymer.

7. The flame retardant composition according to claim 1, wherein one or more of diisononyl phthalate, diisobutyl phthalate, dibutyl phthalate, benzylbutyl phthalate, di-n-octyl phthalate, diisodecyl phthalate, diethylhexyl phthalate, or propylene carbonate as a plasticizer is additionally added to the prepolymer.

8. The flame retardant composition according to claim 1, wherein the main material additionally comprises 5 to 50 parts by weight of at least one alcohol selected from the group consisting of ethylene glycol, diethylene glycol, propylene glycol, dipropylene glycol, butanediol, pentanediol, hexanediol, neopentyl glycol, cyclohexylene glycol, trimethylolpropane, glycerin, pentaerythritol, methylglycoside, diglycerin, and sucrose.

9. The flame retardant composition according to claim 1, wherein the main material comprises at least one of an amine catalyst selected from triethylenediamine, pentamethylenediethyltetramine, N-ethylmorpholine, diethylethanolamine, and 1,8-diazabicyclo(5.4.0)undecene-7 or a metal catalyst selected from stannous octylate, dibutyltin dilaurate, and lead octylate, in an amount of 0.1 to 5 parts by weight.

10. A method of preparing a flame retardant composition including, expanded graphite, and a polyurethane-urea hybrid coating agent composition, wherein the polyurethane-urea hybrid coating agent composition includes a binary composition composed of a hardening agent and a main material, the method comprising:
   preparing a prepolymer hardening agent having an isocyanate terminal by addition-polymerizing a mixture comprising polyether-based polyol and polyester-based polyol in a weight ratio of 9:1 to 1:9, and a modified methyl diphenyl diisocyanate having a carbodiimide bond, to obtain the prepolymer hardening agent having an isocyanate terminal;
   wherein a weight ratio of the mixture of polyols to the modified methyl diphenyl diisocyanate is 5:5 to 2.5:7.5;
   preparing a flame retardant by mixing 30 to 70 parts by weight of a polyphosphate-based flame retardant and 5 to 40 parts by weight of an inorganic flame retardant;
   preparing the main material by mixing 200 to 400 parts by weight of ether-type polyol having a divalent to trivalent amine terminal, 20 to 300 parts by weight of at least one polyol selected from the group consisting of divalent to trivalent polyester-based polyols and divalent to octavalent polyether-based polyols, and 80 to 200 parts by weight of a divalent amine monomer as a chain extender; and
   mixing the main material, the flame retardant, and the expanded graphite.

11. The method according to claim 10, wherein a weight ratio of the polyether-based polyol to the polyester-based polyol of the hardening agent is 9:1 to 7:3.

12. The method according to claim 10, wherein a weight ratio of the polyether-based polyol to the polyester-based polyol of the hardening agent is 9:1 to 8:2.

13. The method according to claim 10, wherein a weight ratio of the mixture of polyols to the modified methyl diphenyl diisocyanate is 4:6 to 3:7.

14. The method according to claim 10, wherein a weight ratio of the mixture of polyols to the modified methyl diphenyl diisocyanate is 3.5:6.5 to 3:7.

15. The method according to claim 10, wherein the prepolymer further comprises one or more flame retardants selected from the list consisting of n-butyl acid phosphate, trimethylphosphate, triphenylphosphate, tricresylphosphate, and triethylphosphite.

16. The method according to claim 10, wherein the prepolymer further comprises one or more of diisononyl phthalate, diisobutyl phthalate, dibutyl phthalate, benzylbutyl phthalate, di-n-octyl phthalate, diisodecyl phthalate, diethylhexyl phthalate, or propylene carbonate, as a plasticizer.

17. The method according to claim 10, wherein the preparing of the main material further comprises adding 5 to 50 parts by weight of at least one alcohol selected from a divalent alcohol; a trivalent alcohol; and a pentavalent alcohol.

18. The method according to claim 10, wherein the preparing of the main material further comprises adding at least one of an amine catalyst selected from triethylenediamine, pentamethylenediethyltetramine, N-ethylmorpholine, diethylethanolamine, and 1,8-diazabicyclo(5.4.0)undecene-7 or a metal catalyst selected from stannous octylate, dibutyltin dilaurate, and lead octylate, in an amount of 0.1 to 5 parts by weight, based on the total weight of the main material.

19. The method according to claim 10, wherein the preparing of the main material further comprises adding at least one amine catalyst selected from triethylenediamine, pentamethylenediethyltetramine, N-ethylmorpholine, diethylethanolamine, and 1,8-diazabicyclo(5.4.0)undecene-7, and at least one metal catalyst selected from stannous octylate, dibutyltin dilaurate, and lead octylate;
wherein the sum of the amount of amine catalyst and the amount of metal catalyst is 0.2 to 6 parts by weight, based on the total weight of the main material.

20. The method according to claim 17, wherein the at least one alcohol is selected from the group consisting of ethylene glycol, diethylene glycol, propylene glycol, dipropylene glycol, butanediol, pentanediol, hexanediol, neopentyl glycol, cyclohexylene glycol, trimethylolpropane, glycerin, pentaerythritol, methylglycoside, diglycerin, and sucrose.

* * * * *